United States Patent

[11] 3,588,693

| [72] | Inventors | Robert Halley;<br>Robert J. Bolam; Carroll W. Marshall, San Diego, Calif. |
|---|---|---|
| [21] | Appl. No. | 833,245 |
| [22] | Filed | June 9, 1969 |
| [45] | Patented | June 28, 1971 |
| [73] | Assignee | The United States of America as represented by the Secretary of the Navy |

[54] PROPORTIONAL BANDWIDTH FREQUENCY ANALYZER
10 Claims, 2 Drawing Figs.

[52] U.S. Cl. .................................................... 324/77B,
                                                                324/77F
[51] Int. Cl. ...................................................... G01r 23/16
[50] Field of Search............................................ 324/77, 78

[56]                    References Cited
                  UNITED STATES PATENTS
2,958,039   10/1960   Anderson.....................   324/77

Primary Examiner—Edward E. Kubasiewicz
Attorneys—Joseph C. Warfield, Jr., George Rubens and John W. McLaren ABSTRACT: A signal processing method for the real-time analysis of frequency components within an input signal employs low-pass filter means capable of passing at least the highest frequency to be analyzed; the filtered input signals are sampled at a rate equal to or greater than the Nyquist rate for the highest frequency to be analyzed. The sampled signal data is then stored in an appropriate means and the stored data is caused to be repetitively read out at variable rates which are greater than the sampling rate whereby frequency multiplication factors are produced as a function of the instantaneous readout rate and the sampling rate. A fixed bandwidth filter receives the readout data, the center frequency of the filter being equal to the product of the instantaneous frequency being analyzed and the instantaneous multiplication factor. Further sampling means may be arranged to receive the outputs of the fixed bandwidth filter and to operate at a rate which is a function of the variable rate of reading out the stored data for producing sample data within a selected frequency spectrum to be analyzed.

PATENTED JUN28 1971          3,588,693

INVENTORS
ROBERT HALLEY
ROBERT J. BOLAM
CARROLL W. MARSHALL
BY
ATTORNEYS

3,588,693

PROPORTIONAL BANDWIDTH FREQUENCY ANALYZER

STATEMENT OF GOVERNMENT INTEREST

The invention described herein may be manufactured and used by or for the government of the United States of America for governmental purposes without the payment of any royalties thereon or therefor.

CROSS-REFERENCE TO RELATED PATENT

The present invention relates to a signal processing method and technique for frequency analysis having certain aspects and objects in common with the DELTIC System disclosed in U.S. Pat. No. 2,958,039, issued Oct. 25, 1960 to Victor C. Anderson and assigned to The Regents of the University of California, Berkeley, Calif.

BACKGROUND OF THE INVENTION

In the DELTIC type of frequency analyzer disclosed in the above-referenced U.S. Patent, a recirculating memory is employed where the input rate and output rate of the memory are constant, though different rates. Because of the different rates, a frequency multiplication ratio is developed, but that frequency multiplication ratio a constant since it is a function of the fixed input rate and output rate of the recirculating memory. A sweep oscillator is employed as a local oscillator in the heterodyne type of mixer where it is combined with the high speed data to sweep across the frequency range of interest which it is desired to analyze. Either the upper or lower sideband may then be fed to a fixed frequency analyzing filter and a constant bandwidth output results from these operations on the received input signal which it is desired to analyze. It is important to note that the DELTIC and similar types of systems produce a constant bandwidth output so that if it is desired, as it frequently is, to analyze a signal whose component bandwidths are a direct function of frequency (harmonic sets, etc.), the constant bandwidth process will match filter bandwidth to component bandwidth at only one point in the analysis frequency range and will thus suffer a loss of processing gain at all other frequencies.

As a background to the concept of the present invention, it would be well to bear in mind that generally related prior art systems as well as the present invention are directed to a frequency analysis technique which accepts a single broadband input such as may be stored on a magnetic tape recorder and then effecting the analysis of that input signal by determining its frequency content in each of the great number of selected or predetermined bandwidths. Provided in the multiplication ratio equals or exceeds the number of bandwidths to be analyzed, this process may be carried out continuously in real time.

SUMMARY OF THE INVENTION

The present invention comprises a technique, method, and apparatus for real-time frequency analysis by data processing of a broadband input signal. Initially, the input signal is caused to be filtered by an appropriate low-pass filter means which is adapted to pass at least the highest frequency to be analyzed. That is to say, the low-pass filter must not filter out the highest frequency of interest which it is desired to detect as a frequency component of the input signal. The filtered input signal is sampled at a rate which is not less than the Nyquist rate for the highest frequency in the filtered input. The filtered input signals may be sampled at a rate which is 1½ times the Nyquist rate for the highest frequency to be analyzed for reasons which will be more fully explained hereafter.

The sampled data is stored in an appropriate means such as a core memory or a Large Scale Integration shift register, hereinafter referred to as an LSI shift register. Appropriate means are provided within the storage means to recirculate the data and such recirculation may be accomplished, for example, in the manner generally described in the Anderson patent previously referenced. The stored data is recirculated a sufficient number of times to provide outputs for each frequency bandwidth of interest.

It is important to note, however, that the delay line recirculation rate of the DELTIC System is constant (input sample rate X constant), and the present invention contemplates a changing rate of recirculation of the stored data (input sample rate X variable) so that the stored data is read out at varying multiples of the input rate. Accordingly, a constantly changing multiplication factor is developed as a function of the relation of the input data rate to the changing output data rate. The changing readout rate may be effected by a sweep output clock which is constantly changing readout rate or by a step output clock which causes the rate of readout to be changed in discrete steps. In either case, if the readout rate of the recirculating memory is caused to be changed by a factor of two-to-one in frequency, the frequency multiplication ratio also is changed by a factor of two-to-one.

The data which is readout is connected as the input to a fixed frequency filter of an appropriate bandwidth with the result that the filter behaves in a manner of a proportional bandwidth filter, effectively changing bandwidth by a factor of two-to-one during the period of the change of rate of reading out the stored data by a factor of two-to-one. The signal data thus filtered is sampled at a rate which is a function of the variable rate at which the stored data is read out, thus producing sample data within a selected frequency spectrum providing the analysis of frequency content of the initial input signal as desired.

An additional feature and advantage of the present invention is that since the top frequency of each octave is just half that of the octave above it, the necessary sample rate is also cut in half, and the same number of pieces of signal information may represent twice the sample time in storage. This, in turn, means that each succeeding lower octave must be analyzed only half as often as the octave above it. Accordingly, if the system is then arranged to analyze the top octave in a period of time which is something less than half of the amount of time represented by the storage sample for that octave, it is possible to analyze all lower octaves in the time remaining.

Moreover, if an octave is omitted from an analysis, there will be sufficient time to analyze a second set of all octaves lower in frequency than the one which has been omitted and such additional analysis may be accomplished concurrently. Further, by eliminating several higher octaves, an increased number of channels may be processed and completely analyzed, the number of additional channels being equal to the number of octaves eliminated to the power of two.

That is to say, that by eliminating several higher octaves from a given input signal, an increased number of channels equal to the number of octaves to the power of two of separate input data may be analyzed, effectively affording that many additional data analysis channels.

While the number of octaves and/or channels analyzed in real time can thus be adjusted depending upon the frequency range of interest, the analysis storage required is a direct function of the number of octaves analyzed.

Another most important and basic feature of the present invention is that by processing the highest octave of the frequency of interest in one-half real time, all the lower octaves may be simultaneously processed by the method, technique, and apparatus conceived by the present invention.

Accordingly, it is the primary object of the present invention to provide a frequency analyzer which obviates significant disadvantages of known prior art systems.

Another most important object of the present invention is to provide a frequency analyzer system which produces a proportional bandwidth output so that a single fixed bandwidth output filter may be employed for the analysis in real time of a plurality of frequencies of interest to be analyzed.

A further important object of the present invention is to provide a frequency analyzer system which is capable of analyzing a number of channels of signal data simultaneously.

Another most important aspect and object of the present invention is to provide a frequency analyzer system which is capable of processing the highest octave of a frequency of interest in one-half real time so that all lower octaves may be simultaneously processed by the same system of an apparatus.

A further object of the present invention is to provide a frequency analyzer system and apparatus which operates so that the elimination of any one selected octave of a first frequency of interest, allows all lower octaves of a second channel of separate data input to be simultaneously processed and analyzed.

Yet another object of the present invention is to provide a frequency analyzer, technique, and system which is operative so that by eliminating several higher octaves of a frequency of interest, an additional number of channels may be provided for simultaneous frequency analysis of separate input data, the number of such additional channels being equal to octaves eliminated to the power of two.

A further most important object of the present invention is to provide a data process, technique, and proportional bandwidth frequency analyzer apparatus which is adaptable to operate upon either digital or analog broadband input signals.

These and other objects, advantages, and features of the present invention will be more fully understood from an understanding of the operation of several embodiments of the present invention illustrated in drawings and adapted to function in accordance with the novel technique and method of data processing which comprises the present invention.

DESCRIPTION OF THE PREFERRED EMBODIMENTS

Figure 1:
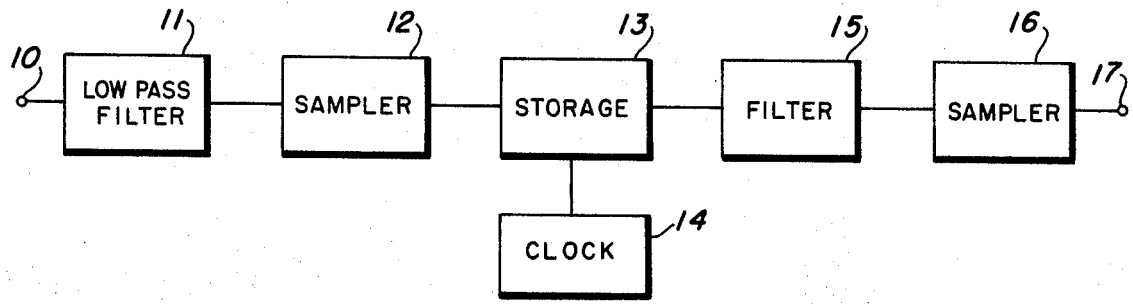
FIG. 1 is a schematic block diagram of the basic elements arranged to operate in accordance with the technique and method of data processing conceived by the present invention.

The drawing of FIG. 1 illustrates a basic combination of apparatus arranged and adapted to implement the technique and method of data processing conceived by the present invention. An input terminal 10 is arranged to receive a broadband input signal of undetermined frequency components. Such broadband input signal may be either digital or analog in nature. Since the basic object of the present invention is to provide a significantly improved method and means for the analysis of frequency components within the broadband input signal, a low-pass filter 11, connected to receive the broadband input signal impressed upon input terminal 10 must be capable of passing at least the highest frequency of those frequencies of interest which it is desired to detect and analyze.

The filtered output of the low-pass filter 11 is connected as the input to a sampler 12 which samples the filtered input signals at a rate not less than the Nyquist rate for the highest frequency passed by the low-pass filter. The sampled input signal data is then connected to an appropriate storage means 13 where the data is stored and caused to be recirculated in a manner which will be more fully described hereinafter. The clock 14 performs the function of causing the reading out of the stored data from the storage element 13 whence it is filtered by connection to a fixed bandwidth filter 15. The filtered output of element 15 is connected to a further sampler 16 which samples the filtered output so as to provide an output signal of each frequency component of interest contained within the initial broadband input signals impressed upon the input terminal 10.

OPERATION

The technique and method of processing input data which is conceived by the present invention requires that the broadband input signals which it is desired to analyze for all or selected frequency components be filtered by a low-pass filter such as that illustrated schematically at 11 which filter must be capable of passing at least the highest frequency to be analyzed. That is to say, that the low-pass filter means must not filter out any frequency which it is desired to analyze. The broadband input signal of unknown frequency content, when thus filtered, is operated upon by a sampler 12 which samples at a rate equal to or greater than the Nyquist rate for the highest frequency passed by the low-pass filter. To illustrate, if a frequency range is limited to B cycles per second, 2B is the maximum number of code elements per second that can be unambiguously resolved, assuming that the peak interference is less than half a quantum step. This rate is generally referred to as the Nyquist rate. Accordingly, the present invention requires that the initial sampling of the filtered input signals be at a sampling rate which is at least twice that of the highest frequency of interest which it is wished to analyze.

The signals thus sampled are stored, uninterrupted and interlaced with the storage readout, in an appropriate storage means such as that indicated schematically by the storage element 13 of FIG. 1 and the stored data is caused to be read out by a clock 14 at variable rates greater than the sampling rate. This operation produces a frequency multiplication factor which is a function of the instantaneous reading out rate as related to the fixed sampling rate. The clock 14 and the storage 13 operate in coaction so as to cause repetitive recirculation of the stored data for at least as many times as there are selected bandwidths of interest which it is desired to analyze. The selected multiplication ratios must be sufficiently high to allow the requisite number of recirculations to be made in the time allowed. This is usually equal to or less than the amount of time represented by the signal samples in the storage. The repetitive recirculation and reading out of the stored data as effected by the clock 14 and the storage element 13 is accomplished at variable rates, which variation may be continuous or discontinuous in discrete steps as will be explained more fully hereinafter.

The stored data which is repetitively recirculated and read out at variable rates is fed to a fixed bandwidth filter 15, the center frequency of which is equal to the product of the instantaneous frequency of interest being analyzed and the instantaneous multiplication factor. Another way in which this may be expressed is that the fixed filter 15 is required to have a center frequency determined by the product of the lowest multiplication rate and the highest frequency to be analyzed. The bandwidth may be defined as that portion of the center frequency for which an analysis is desired.

The output of the fixed filter 15 is fed to a sampler 16 which operates at a variable sampling rate coordinated with the variable rates of reading out the stored data so that the instantaneous sampling rate of the sampler 16 is a function of the instantaneous variable rates at which the stored data is caused to be read out of the storage element 13 by the clock 14. This latter sampling is effected at a variable rate in accordance with the frequency bandwidth of interest it is desired to analyze.

As previously explained, the clock 14 of the embodiment schematically illustrated in FIG. 1 is employed to control the output rate of the data stored and recirculated in the storage element 13. For example, the variable output rate of the recirculated sampled data contained in the storage element 13 may vary over a two-to-one frequency range. Accordingly, the frequency multiplication ratio changes by a factor of two-to-one. Since the frequency multiplication is a function dependent upon the constant sampling rate of sampler 12 and the varying reading out rate effected by the operation of clock 14 upon the storage element 13, the output data which is read out of the storage element 13 has a varying multiplication factor. The output readout of storage element 13 is fed to the fixed frequency filter 15 having a desired bandwidth, with the result that the fixed filter 15 behaves effectively in the manner of a proportional bandwidth filter, changing bandwidth by a factor of two-to-one during the period of the change of two-to-one of the readout rate from storage element 13.

Figure 2:
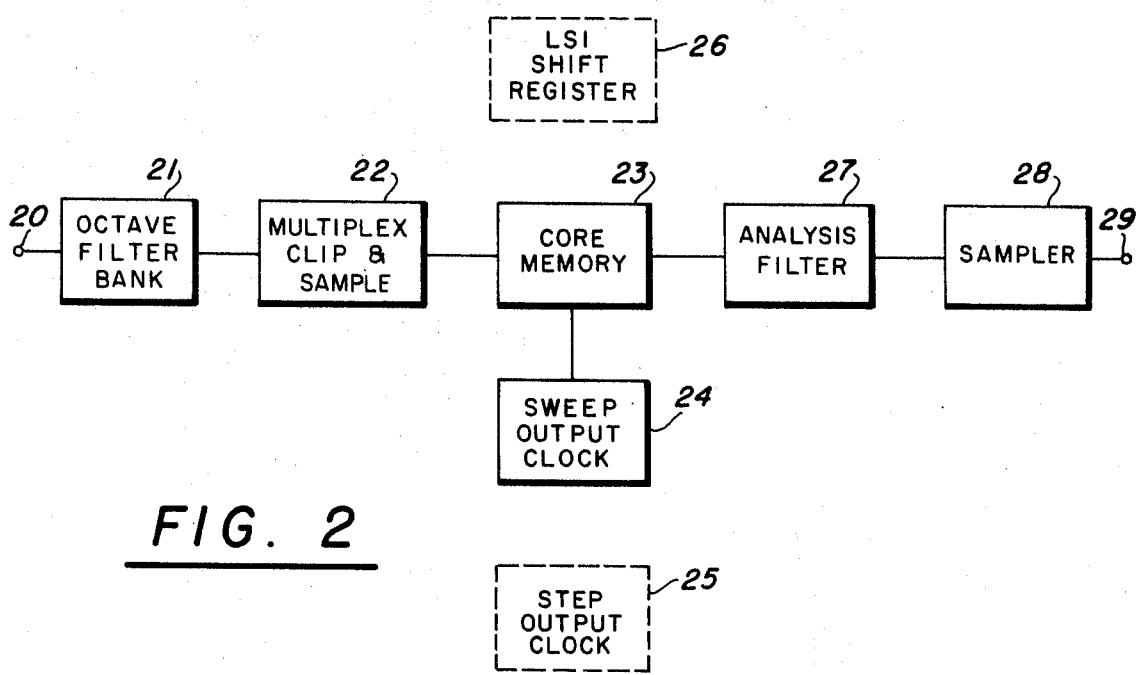
FIG. 2 is a schematic block diagram illustrating a more specific implementation of the present invention.

The fixed filter 15 may actually comprise a number of separate filters arranged in a parallel manner and chosen to give determinable and desirable preset bandwidths at the outputs. FIG. 2 illustrates the embodiment of the present invention wherein the input broadband signal of unknown frequency content is received at an input terminal 20 and fed to a low-pass filter means 21 which may comprise an octave filter bank consisting of a plurality of filters, each designed to be operative within a predetermined octave of frequencies of interest.

The output of the octave filter bank 21 may be fed to a multiplex, clip and sample means 22 which is adapted to multiplex the plural outputs of the filter bank 21, clip the filter signals, and sample the signals at rates which are at least twice the frequency of the highest frequency of interest within each octave. This is, of course, the Nyquist rate or greater as previously described and defined. The outputs of the multiplex, clip, and sample element 22 are fed, uninterrupted and interlaced with the storage readout, to a storage means 23 which may comprise a magnetic core memory of substantially conventional design. The recirculation of data within the magnetic core memory 23 may be effected by an output clock 24 which may operate in a constantly variable manner of a sweep output clock, changing the readout rate of the core memory 23 by a sweep of the readout rate and recirculation rate across a desired frequency range.

Alternatively, the output clock 24 may comprise a step output clock in which the variation of the output readout rates of the core of memory is effected in discrete varying steps across a desired frequency range. Thus, the step output clock 25 is an equivalent and alternative in its operative function relative to the sweep output clock 24 as shown in FIG. 2.

In a similar manner, the magnetic core memory 23 may be replaced in the system illustrated in FIG. 2 by a Large Scale Integration shift register 26. The LSI shift register 26 will operate to recirculate digital data stored in the system to produce a readout rate which varies under the control of either a sweep output clock 24 or a step output clock 25 in accordance with the concept of the present invention. The output of the LSI shift register 26 therefore would take the place of the output of the magnetic core memory 23 and provide an input to the analysis filter 27 which, as mentioned before, may comprise a number of filters to develop different percentages of bandwidth. These filters are, however, fixed bandwidth filters which operate and function in the manner of a proportional bandwidth filter as previously disclosed in describing the concept, technique, and method of the present invention.

The sampler 28 receives the output of the analysis filter 27 and provides sampling at rates which are variable as a function of the readout rates of the data from the memory 23 or the LSI shift register 26 to provide analysis of the frequencies of interest. This may appropriately be a multiplex operation where selected octaves of the input broadband signals are desired to be analyzed for frequency content.

In accordance with the concept of the technique, method, and apparatus of the present invention, the multiplication factor which is developed as a result of the ratio between the constant sampling rate of the multiplex, clip, and sample element 22 and the varying readout rate of the stored memory element 23 as determined by the sweep output clock 24 or the step output clock 25, may be arranged to be sufficient for analysis of all frequency bandwidths of interest in real time.

By eliminating any one selected octave, the concept of the present invention can be employed to process and analyze all lower octaves of a second channel of separate input signals, thereby effectively affording that many additional channels for simultaneous frequency analysis.

Alternatively, by eliminating several octaves, effectively an increased number of channels are available under the concept of the present invention, which increased number of channels is equal to the number of octaves eliminated to the power of two. Thus, that many additional separate input broadband signals can be processed and analyzed in the effectively additional channels and all this may be accomplished simultaneously without loss of the efficacy of the apparatus.

Another most important feature of the present invention is that by processing and operating upon the highest octave frequency of interest in one-half real time all the lower octaves may be simultaneously processed and analyzed, employing the concept, teaching, and data processing technique and method of the present invention.

Those knowledgeable and skilled in the art will readily appreciate that proportional bandwidth frequency analysis may be effected by the technique, method, and teaching of the present invention in a much simpler manner than was heretofore possible with prior art comparable systems and that the present invention has conceived a method and techniques of processing data which is equally well implemented by digital or analog equipments.

We claim:

1. Apparatus for analyzing frequency components of input signals comprising:
   low-pass filter means for passing at least the highest frequency to be analyzed;
   means for sampling the filtered input signals at a rate equal to or greater than the Nyquist rate for the highest frequency in the filter output;
   means for storing the sampled data;
   means for repetitively reading out the stored data at variable rates greater than the sampling rate whereby to produce frequency multiplication factors as a function of the instantaneous reading out rate and the fixed sampling rate; and
   fixed bandwidth filter means arranged to receive the readout data, the center frequency of said fixed filter being equal to the product of the instantaneous frequency being analyzed and the instantaneous multiplication factor.

2. An apparatus for analyzing frequency components of input signals as claimed in claim 1 wherein said low-pass filter means passes selected octaves of frequencies contained in said input signal.

3. An apparatus for analyzing frequency components of input signals as claimed in claim 1 wherein said low-pass filter means comprises an octave filter bank for passing selected octaves of frequencies to be analyzed.

4. An apparatus for analyzing frequency components of input signals as claimed in claim 1 wherein said means for reading out stored data comprises a sweep output clock for reading out stored data at constantly varying rates.

5. An apparatus for analyzing frequency components of input signals as claimed in claim 1 wherein said means for reading out stored data comprises an output clock for reading out stored data at varying frequencies in discrete steps.

6. An apparatus for analyzing frequency components of input signals as claimed in claim 1 wherein said multiplication factor is sufficient to analyze all frequency bandwidths of interest in real time.

7. An apparatus for analyzing frequency components of input signals as claimed in claim 1 wherein the multiplication factor is sufficient to analyze all frequency bandwidths of interest within the highest selected octave in one-half real time.

8. An apparatus for analyzing frequency components of input signals as claimed in claim 1 and including additional sampling means for receiving the outputs of said fixed bandwidth filter means and being operative at an instantaneous rate which is a function of the instantaneous variable rates of reading out said stored data for producing sampled data within selected frequency spectrums.

9. A method of analyzing frequency components of a signal comprising the steps of:
   low-pass filtering said signal for passing at least the highest frequency to be analyzed;
   sampling the low-pass filtered signals at the rate not less than the Nyquist rate for the highest frequency to be analyzed;
   storing the sampled data;
   reading out the stored data at variable rates greater than the sampling rate; and filtering the readout data for passing only frequencies within a fixed frequency bandwidth the center frequency of which is equal to the product of the instantaneous frequency being analyzed and the instantaneous multiplication factor produced by the variable readout rates.

10. A method of analyzing frequency components of a signal as claimed in claim 9 and further including the step of sampling the frequencies passing within the fixed frequency bandwidth at a rate which is a function of the variable rate of reading out the stored data.